United States Patent

Künzel et al.

[11] Patent Number: 5,914,541
[45] Date of Patent: Jun. 22, 1999

[54] METHOD OF GENERATING A SWITCHING SIGNAL ON REACHING A PARTICULAR CONDITION, AND CIRCUIT FOR CARRYING OUT THE METHOD

[75] Inventors: Richard Künzel, Schwarzenbruck; Otto Schwandner, Fürth, both of Germany

[73] Assignee: Siemens AG, Munich, Germany

[21] Appl. No.: 09/011,094

[22] PCT Filed: Jul. 23, 1996

[86] PCT No.: PCT/EP96/03250

§ 371 Date: May 11, 1998

§ 102(e) Date: May 11, 1998

[87] PCT Pub. No.: WO97/05455

PCT Pub. Date: Feb. 13, 1997

[30] Foreign Application Priority Data

Jul. 31, 1995 [EP] European Pat. Off. ............. 95112026

[51] Int. Cl.[6] ................................. H01H 1/04; H02B 1/24
[52] U.S. Cl. ........................... 307/112; 307/116; 702/94; 702/95
[58] Field of Search ..................... 307/112, 113, 307/115, 116; 327/1; 365/189.07; 495/80, 88; 702/94, 95, 97, 116, 117

[56] References Cited

U.S. PATENT DOCUMENTS 5,231,596  7/1993  Nakazawa et al. .
5,399,964  3/1995  Zoller ........................................ 324/103
5,541,506  7/1996  Kawakita et al. .................... 324/207.2
5,541,508  7/1996  Suzuki ................................ 324/207.21
5,761,136  6/1998  Park et al. ................................ 365/191

FOREIGN PATENT DOCUMENTS 0 286 322   10/1988   European Pat. Off. .

*Primary Examiner*—Jeffrey Gaffin
*Assistant Examiner*—Peter Zura
*Attorney, Agent, or Firm*—Kenyon & Kenyon

[57] ABSTRACT

A switching method for producing a switching signal on reaching a switching condition, an evaluation circuit being supplied successively in time with a sequence of measurements which each comprise at least two bits, the measurements being checked for the switching condition in accordance with their time sequence, and the switching signal being produced as soon as the switching condition is reached for the first time. The two most significant bits of each measurement, are compared with one another and with the two most significant bits of the immediately preceding measurement, and in that the switching condition is changed when the two most significant bits of the respective measurement have the same value and when the two most significant bits of each measurement both differ from the two most significant bits of the immediately preceding measurement.

3 Claims, 2 Drawing Sheets

METHOD OF GENERATING A SWITCHING SIGNAL ON REACHING A PARTICULAR CONDITION, AND CIRCUIT FOR CARRYING OUT THE METHOD

FIELD OF THE INVENTION

The present invention relates to a switching method for producing a switching signal on reaching a switching condition.

BACKGROUND INFORMATION

Absolute position transmitters detect the position of a movable element, for example of a movable slide, and report this position on to a superordinate controller. Every position within the movement path is in this case detected precisely, for example using 12 bits. Thus, there is one, and only one, bit pattern which corresponds to each position of the movable element, and, conversely a quite specific section of the movement path corresponds to each bit pattern—within the measurement accuracy. The absolute position transmitter supplies the value "0" at one position on the movement path. This point need not in this case be arranged at one of the ends of the movement path, but may be located at any desired point. Passing through the position at which the absolute position transmitter emits the value "0" is called a zero crossing.

If it is intended for the movement element to drive to any desired new position within the movement path, the current ACTUAL position, which is known on the basis of the bit pattern supplied from the absolute position transmitter, is initially compared with the new REQUIRED position. The comparison of the two positions with one another is used to determine the direction in which the movement element must be moved. Furthermore, the new REQUIRED position is converted into its corresponding REQUIRED bit pattern and is loaded into a comparator. The absolute position transmitter continuously detects the ACTUAL position of the movement element and reports the bit pattern corresponding to it to the comparator at constant time intervals. The comparator emits a switching signal to the control element, which moves the movement element, when the ACTUAL bit pattern for the first time becomes less than or greater than the REQUIRED bit pattern, depending on the movement direction. The switching condition is thus that the ACTUAL bit pattern becomes greater than or equal to, or less than or equal to, the REQUIRED bit pattern.

In practice, it is normally not possible to stop the movement element abruptly on reaching the new REQUIRED position. The comparator is thus normally not loaded initially with the bit pattern which corresponds to the new REQUIRED position but with the bit pattern which corresponds to a position which is a specific distance in front of the REQUIRED position to be driven to, in the movement direction. On reaching this position, the movement element is initially changed over from normal drive to inching, and the bit pattern which corresponds to the genuine REQUIRED position is then loaded into the comparator, and the drive, which displaces the movement element, is switched off completely on reaching the REQUIRED position. However, these differences are irrelevant for the problem on which the present case is based. It is thus always assumed in the following text that the REQUIRED position is the position at which the comparator is intended to respond. The response of the comparator can then, depending on the requirement, initiate the changeover of the control drive to inching, or the stopping of the control drive.

However, a number of problems result from the fact that the zero crossing of the absolute position transmitter may lie between the new REQUIRED position and the ACTUAL position of the movement element when the new REQUIRED bit pattern is set. On the one hand, the comparator cannot be loaded immediately with the new REQUIRED bit pattern, since the zero crossing must be detected first. Otherwise, the comparator would, in fact, respond immediately although the position to be driven to had not yet been reached. Furthermore, the comparator also responds when an accidental zero crossing of the absolute position transmitter occurs after the loading of the comparator. However, the major problem is presented by the situation in which the REQUIRED position is located shortly before the transmitter zero crossing. Specifically, as a result of the sampling, it is possible that the last sample before the zero crossing will no longer detect the switching point. In this case, the system moves past the REQUIRED position without the comparator responding.

In the prior art, the bit pattern supplied from the absolute position transmitter is thus always converted into the position corresponding to it and is compared with the new REQUIRED position. The switching signal is now emitted on reaching or moving past the new REQUIRED position. This procedure admittedly avoids the problems mentioned above in comparing the bit patterns with one another, but is time-consuming and cumbersome. Furthermore, it is not possible to ensure a constant reaction time reliably.

SUMMARY OF THE INVENTION

The present invention provides a switching method for producing a switching signal on reaching a switching condition, an evaluation circuit being supplied successively in time with a sequence of measurements which each comprise at least two bits, the measurements being checked for the switching conditions in accordance with their time sequence, and the switching signal being produced as soon as the switching condition is reached for the first time, and to the associated position evaluation circuit, having an input channel via which the position evaluation circuit can be supplied successively in time with a sequence of measurements which each comprise at least two bits and having a comparator which is connected to the input channel, checks the measurements for a switching condition successively and produces a switching signal when the switching condition is satisfied.

The object of the present invention is to provide a method and the associated circuit, in the case of which the new REQUIRED bit pattern can be loaded into the comparator immediately and in which, nevertheless, it is not possible for either the problems of accidentally as shown in FIG. 3.

The two most significant bits are monitored and a zero crossing is identified when the two most significant bits change from "00" to "11" or vice versa. The switching condition is also changed here this case.

DETAILED DESCRIPTION OF THE INVENTION

Figure 1:
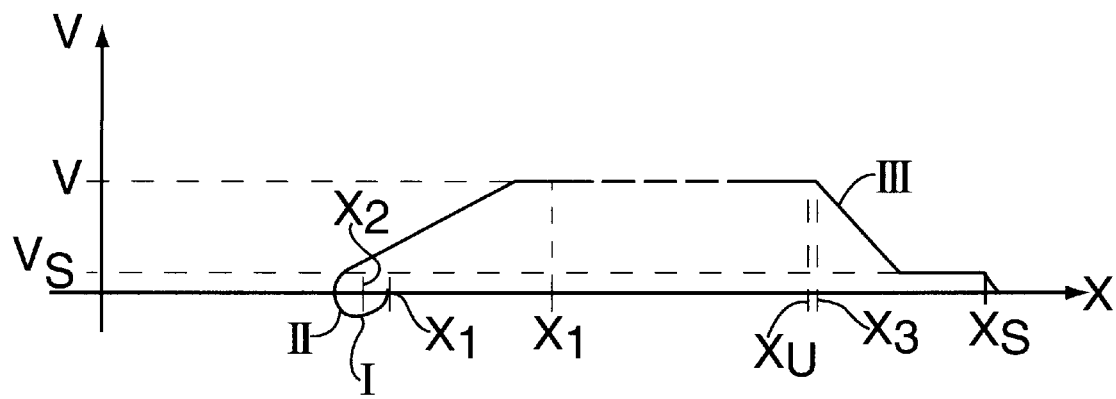
FIGS. 1 and 2 show a system driving to a new REQUIRED position.

FIG. 1 now shows the system driving to a new REQUIRED position, when a movement in the positive direction is required for this purpose. According to FIG. 1, driving from the current ACTUAL position $x_I$ to a new REQUIRED position $x_S$ takes place as follows: first of all, the brake of the movement element is released. This releases the movement element and it moves to the left driven, for example, by gravity. This corresponds to the section I of the curve illustrated in FIG. 1. Immediately after this, the drive is switched on and it initially brakes the movement element in accordance with curved section II and then accelerates it to the full movement speed v. This speed v is maintained until the movement element reaches the changeover position $x_U$. On reaching this position $x_U$, the movement element is decelerated in accordance with curved section III until it is still moving only at the inching speed $v_S$. The drive is now switched off on detecting the actually desired REQUIRED position $x_S$. The brake of the movement element is applied immediately after this, so that said movement element is locked in the new REQUIRED position $x_S$.

Figure 2:
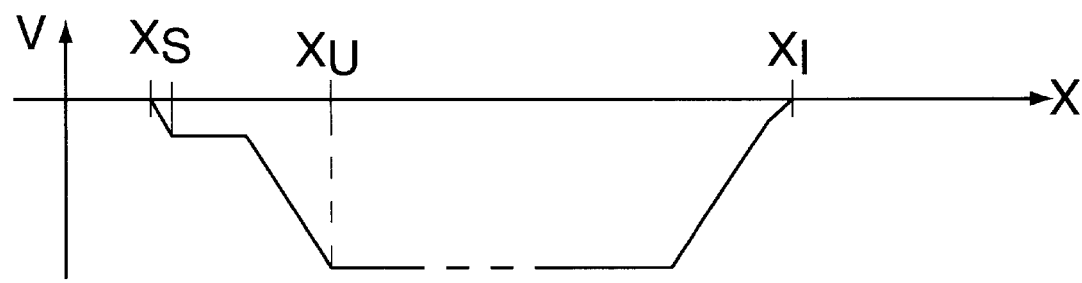

FIG. 2 shows the system driving to a new REQUIRED position $x_S$ from the current ACTUAL position $x_I$ when a movement of the movement element in the negative direction is required for this purpose. Except for the fact that the movement element moves immediately in the negative direction after the brake has been released and there is no need for any direction reversal first by the drive, the procedure is completely analogous to that in FIG. 1.

Figure 3:
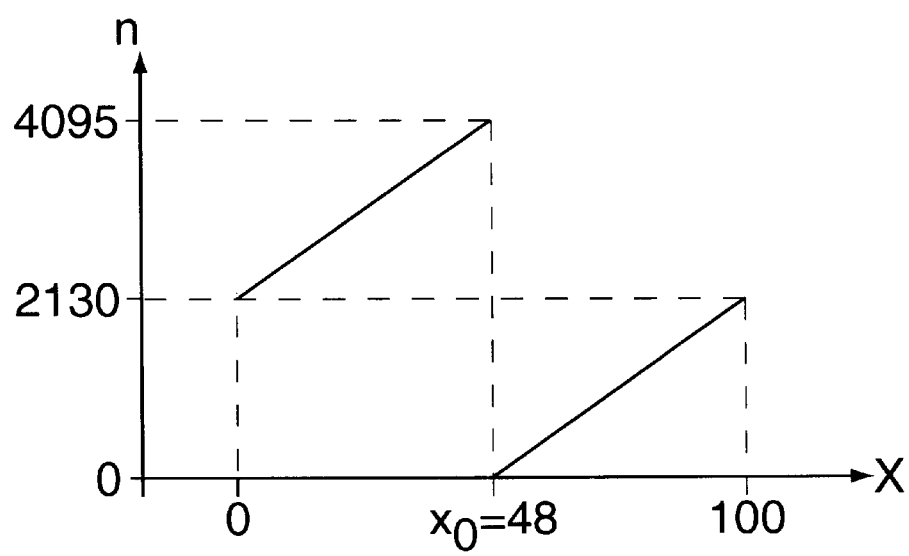
FIG. 3 shows an illustration of the movement path plotted against the output signal from the absolute position transmitter.

FIG. 3 now shows, for example, the bit patterns n supplied from the absolute position transmitter, as a function of the movement distance x. In this case, it is (arbitrarily) assumed that the movement element can move between a position "0" and a position "100", and that the absolute position transmitter has a resolution of 12 bits. The possible bit patterns n thus extend from 0=0000 0000 0000$_2$ to 4095=1111 1111 1111$_2$. The bit patterns n are illustrated as decimal values in FIG. 3, for the sake of improved clarity. As can furthermore be seen from FIG. 3, it is assumed that the transmitter zero crossing occurs at $x_0$=48. Alternatively, it could occur at a different point.

Figure 4:
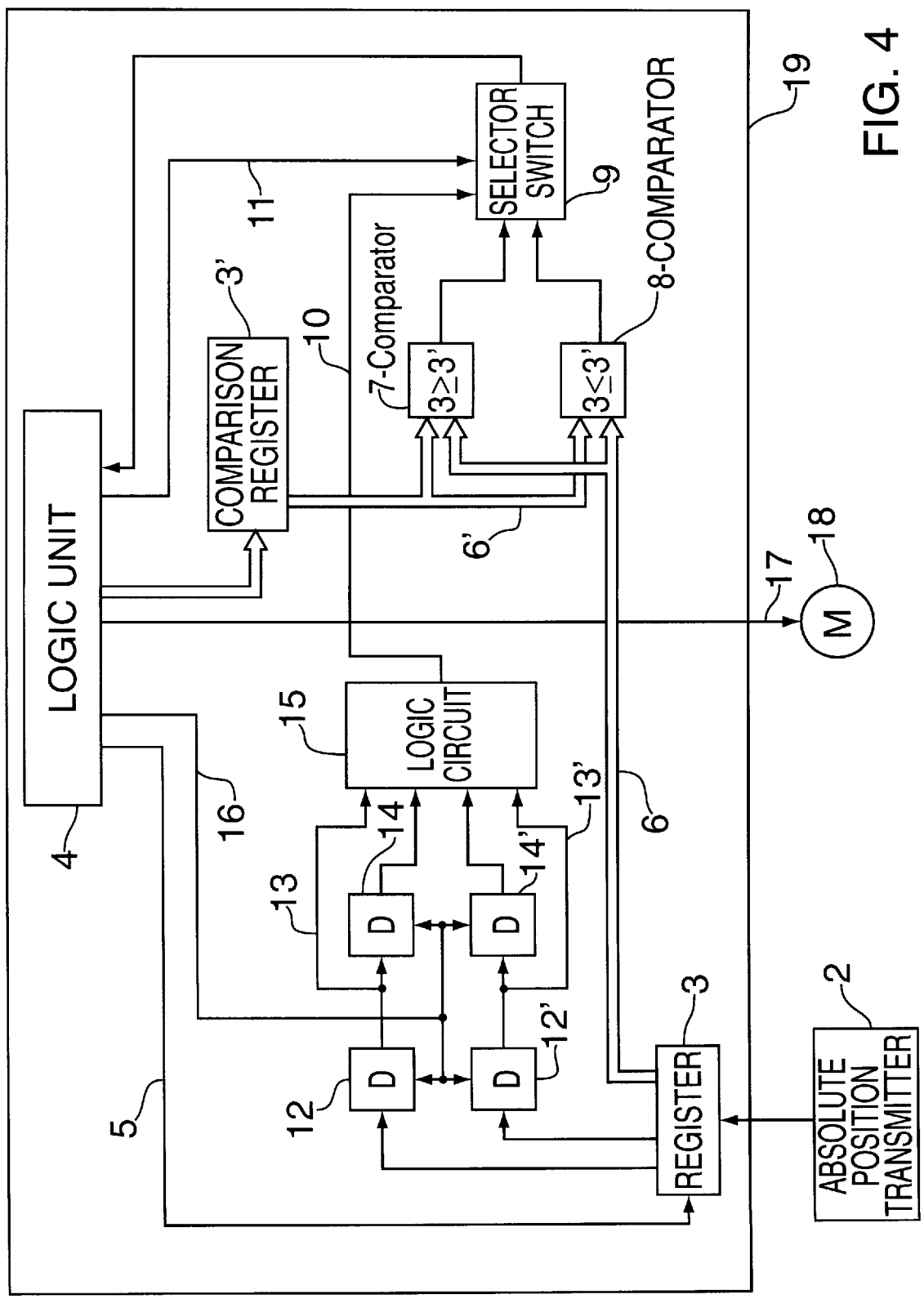
FIG. 4 shows a circuit according to the present invention.

FIG. 4 now shows the evaluation circuit by means of which the processing of the bit patterns supplied from the absolute position transmitter is carried out. According to FIG. 4, the position detection of the absolute position transmitter 2 supplies a bit pattern which is passed on, for example via an SSI (=serial synchronous interface), to the register 3. The evaluation circuit is thus supplied with a sequence of measurements, successively in time. However, only every tenth bit pattern, for example, rather than each bit pattern is supplied to the evaluation circuit, because of the relatively slow serial data transmission.

The register 3 is addressed periodically by the logic unit 4 via the control line 5. Whenever it is addressed, the contents of the register 3 are read out and are supplied via the data lines 6 to the comparators 7 and 8. The comparators 7 and 8 are furthermore supplied, via the data lines 6', with the contents of the comparison register 3'. The comparison register 3' is loaded with the bit pattern n from the logic unit 4 at the start of each movement process, this bit pattern n corresponding to the next position at which a reaction is intended to take place. Thus, for example, the next changeover position $x_U$ or the next REQUIRED position $x_S$ is loaded into the comparison register 3'.

The comparator 7 emits a switching signal when the contents of the register 3 are greater than or equal to the contents of the register 3'. The comparator 8 emits a switching signal when the contents of the register 3 are less than or equal to the contents of the register 3'. The switching condition of the comparator 7 is thus that the contents of the register 3 are greater than or equal to the contents of the comparison register 3'. On the other hand, the switching condition of the comparator 8—except for the singular case of equality—is complementary to that of the comparator 7.

The output signals of the comparators 7 and 8 are supplied to the selector switch 9, which selects one of the two switching signals and supplies it to the logic unit 4. When a switching signal occurs at the output of that comparator 7 or 8 which is switched through, because the corresponding switching condition has been satisfied, the logic unit 4 records this and emits a corresponding control signal via the control line 17 to the control element 18, for example a motor, which drives the movement element in order to brake it or to stop it. If the logic unit 4 does not receive a switching signal, the motor 18 is driven as before.

The selector circuit is supplied via the control lines 10 and 11 with two control signals. The logic unit 4 uses the control line 11 to define which of the two switching signals supplied from the comparators 7 and 8 is intended to be selected at the start of a movement process. Whenever a transmitter zero crossing occurs, the selector circuit 9 is supplied via the control line 10 with a changeover signal, however, which results in the selector circuit 9 being switched over. Thus, if the switching signal of the comparator 7 was switched through before the changeover signal was supplied via the control line 10, then the switching signal of the comparator 8 is switched through on and after the transmission of the changeover signal, and vice versa. The outcome of this is that the switching condition is changed.

The changeover signal is produced as follows: whenever the register 3 is read from, the most significant bit is additionally supplied to the D flipflop 12. The output signal of the D flipflop 12 is supplied to the logic circuit 15 on the one hand directly via the data line 13 and on the other hand via a further D flipflop 14. The same action occurs with the second most significant bit by means of the D flipflops 12' and 14' as well as the data line 13'. The D flipflops 12, 12', 14, 14' are in this case each jointly driven via the control line 16 when a new ACTUAL value has been read to the register 3.

Consequently, the two most significant bits of the respective measurement and the two most significant bits of the immediately preceding measurement are available to the logic circuit 15 at all times. The logic circuit 15 compares the four bits available to it with one another. It emits a changeover signal to the selector circuit 9 when one of the two following conditions occurs:

both the most significant bit and the second most significant bit have changed from "0" to "1", or both the most significant bit and the second most significant bit have changed from "1" to "0".

Specifically, only this change is an unambiguous identification sign of a transmitter zero crossing.

Thus, when the changeover signal is present, the switching condition is in consequence toggled by the changeover from the comparator 8 to the comparator 7, or vice versa. Specifically, the changeover takes place from the "greater than or equal" comparison to "less than or equal". This is virtually a complement of the switching condition. The fact that both comparators 7, 8 respond when the register contents of the registers 3 and 3' correspond exactly is a singular particular case which may be ignored in the context of the present invention.

The problems of the prior art are solved by the circuit according to FIG. 4.

If, for example, it is intended to drive from the position $x_I$ according to FIG. 1 to the position $x_S$ according to FIG. 1 and the transmitter zero crossing $x_0$ is located close to the point designated $x_1$, then the command "move the movement element to the right" is emitted to the motor 18 via the control line 17, the comparison register 3' is loaded with the bit pattern $n_U$ which corresponds to the changeover position $x_U$ and the command to switch the comparator 8 through first of all is emitted via the control line 11.

As long as the movement element is located to the left of the transmitter zero crossing $x_0=x_1$—see FIG. 3—the contents of the register 3 are always greater than the contents of the comparison register 3'. Thus, the comparator 8 does not respond. If, in contrast, the system moves past the transmitter zero crossing $x_0=x_1$, then the contents of the register 3 are initially less than the contents of the comparison register 3'. Thus, the comparator 8 responds immediately. However, the selector circuit 9 is switched over when the zero crossing is identified, so that the output signal of the comparator 7 is switched through to the logic unit 4 even during the first comparison after the transmitter zero crossing. However, since the contents of the register 3—compare with FIG. 3 once again—are now initially less than the contents of the comparison register 3', the comparator 7 does not respond at first. The switching condition of the comparator 7 is not satisfied until the system has moved past the changeover position $x_U$ such that, as desired, a switching signal is reported to the logic unit 4 on moving past the changeover position $x_U$, and the logic unit 4 then switches the motor 18 to inching, via the control line 17.

As has already been mentioned in conjunction with FIG. 1, it is possible for movements of the movement element, which are not known in advance, to take place at the start of a movement process. If, for example, the transmitter zero crossing is now located at $x_0=x_2$ (see FIG 1), i.e., the current ACTUAL position $x_I$ and the new REQUIRED position $x_S$ are located on the same side, seen from the transmitter zero crossing, the bit pattern nU which corresponds to the changeover position $x_U$ is loaded into the comparison register 3' again. However, this time, the correct comparator 7 is switched through immediately because of a corresponding control signal via the control line 11. If, as is illustrated in FIG. 1, the system now moves in an uncontrolled manner past the transmitter zero crossing at $x_0=x_2$, the logic circuit 15 responds again and switches the comparator 8 through instead of the comparator 7. A changeover back to the comparator 7 is made again at the second transmitter zero crossing in the acceleration phase.

In contrast, the major problem in the prior art occurred when the transmitter zero crossing was located immediately behind the changeover position $x_U$. For example, the transmitter zero crossing—see FIG. 1—could be located at $x_0=x_3$. In this case, it would be possible, without a comparator changeover, for, in the case of two successive register contents of the register 3, one set of contents still to be located before the changeover point $x_U$ and for the other set of contents actually to be located behind the transmitter zero crossing $x_0=x_3$. In this case, as shown in FIG. 3, the switching condition would not yet be satisfied, without switching over, on comparison of the first of the two sets of register contents with those of the comparison register 3', and would actually no longer be satisfied for the second, as a result of the transmitter zero crossing and the numerical values which would in consequence be lower from the start. The system would thus move past the changeover point $x_U$ without any switching reaction. In contrast, as a result of the changeover from the comparator 7 to the comparator 8, the quasi-complemented switching condition is now checked such that the switching condition of the comparator 8 is satisfied for the first measurement after the changeover position $x_U$ and the transmitter zero crossing $x_0=x_3$, so that this initiates the switching reaction.

The bit patterns which are supplied from the absolute position transmitter 2 can thus be processed directly using the switching method or the associated position evaluation circuit according to the present invention, without these bit patterns firstly having to be converted into the corresponding positions x. In consequence, on the one hand, the reaction time of the circuit can be kept independent of the new REQUIRED value $x_S$, and on the other hand the reaction time is very short.

The circuit according to the present invention can optionally be constructed from discrete components or can be integrated in an integrated circuit 19.

What is claimed is:

1. A method for generating a switching signal when a switching condition is reached, the method comprising the steps of:

providing successively a sequence of measurements to an evaluation circuit, each of the sequence of measurements including at least two bits;

determining if the switching condition is reached checking the sequence of measurements;

generating the switching signal when the switching condition is initially reached at a first time;

comparing a first bit of two most significant bits of each of the sequence of measurements to a second bit of the two most significant bits;

comparing the first bit and the second bit of the two most significant bits of each of the sequence of measurements to a first bit and a second bit of two most significant bits of a preceding measurement; and modifying the switching condition when the first bit and the second bit of each measurement of the sequence of measurements are equal and when the first bit and the second bit of each measurement of the sequence of measurements are different from the first bit and the second bit of the preceding measurement.

2. A position evaluation circuit comprising:

an input channel for successively providing the position evaluation circuit with a sequence of measurements, wherein each of the measurements includes at least two bits;

a comparator connected to the input channel and determining if the switching condition is reached by checking the sequence of measurements, wherein the comparator generates a switching signal when the switching condition is reached;

a memory circuit connected to the input channel, and storing at least two most significant bits of a preceding measurement of the sequence of measurements that is supplied to the position evaluation circuit immediately before a most current measurement of the sequence of measurements; and a zero crossing detection circuit connected to the input channel, to the memory circuit, and to a changeover input of the comparator, wherein the zero crossing detection circuit generates a changeover signal to modify the switching condition when the two most significant bits of the most current measurement of the sequence of measurements are equal and when the two most significant bits of the most current measurement of the sequence of measurements are different from the two most significant bits of the preceding measurement of the sequence of measurements, and wherein the two most significant bits of the preceding measurement of the sequence of measurements are stored in the memory circuit.

3. The position evaluation circuit according to claim 2, wherein the position evaluation circuit is integrated in an integrated circuit.

* * * * *